No. 767,127. PATENTED AUG. 9, 1904.
A. C. STEWART.
CONTROLLER FOR AUTOMOBILES.
APPLICATION FILED OCT. 8, 1903.
NO MODEL.
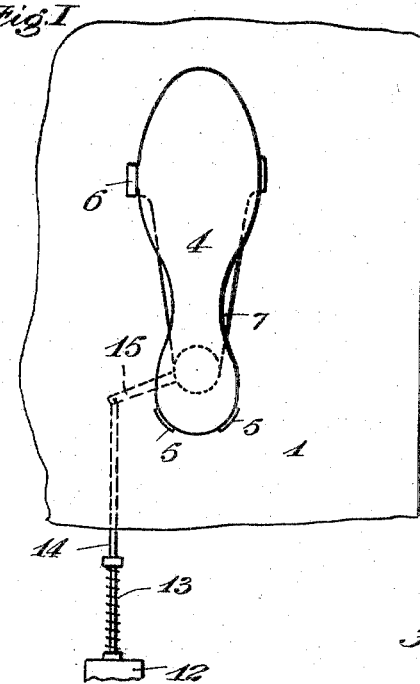
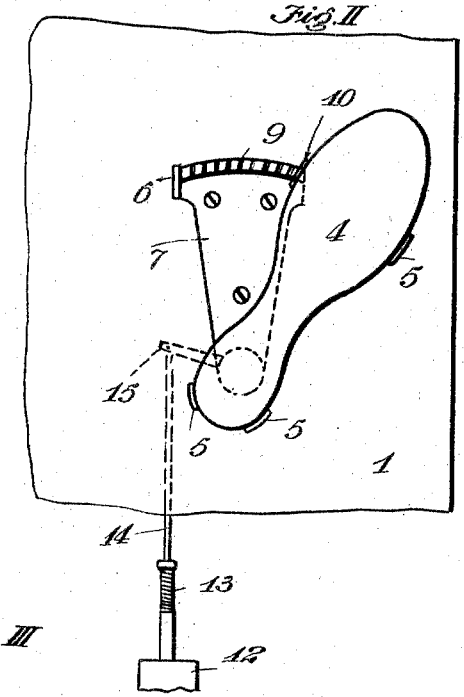
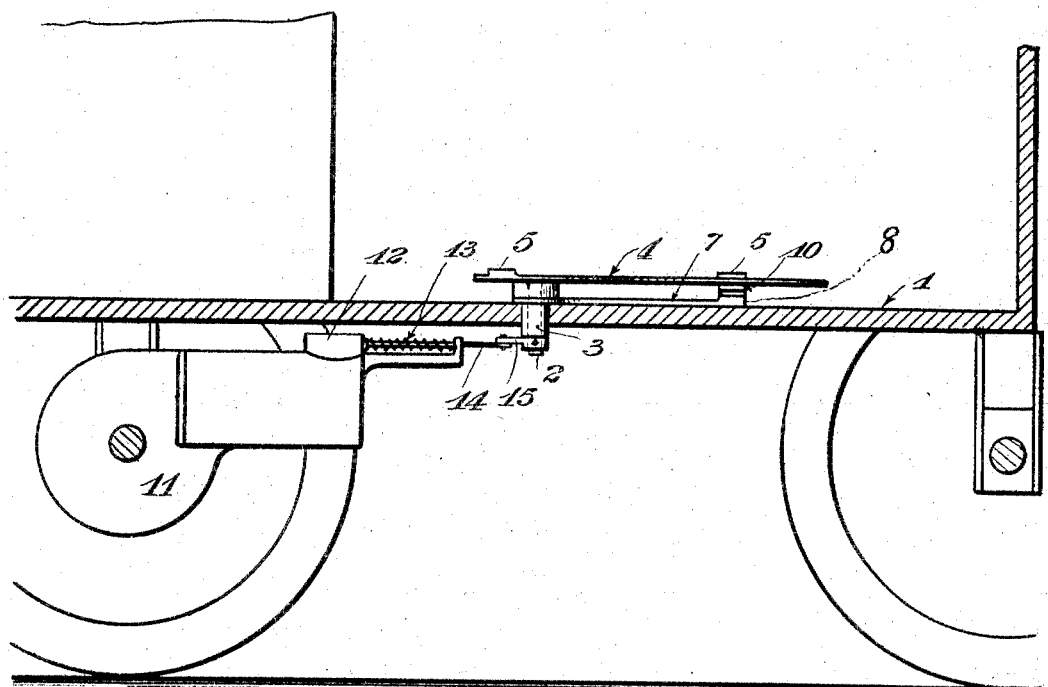
WITNESSES
INVENTOR
ALFRED C. STEWART No. 767,127.

Patented August 9, 1904.

UNITED STATES PATENT OFFICE.

ALFRED C. STEWART, OF LOS ANGELES, CALIFORNIA.

CONTROLLER FOR AUTOMOBILES.

SPECIFICATION forming part of Letters Patent No. 767,127, dated August 9, 1904.

Application filed October 8, 1903. Serial No. 176,177. (No model.)

*To all whom it may concern:*

Be it known that I, ALFRED C. STEWART, a citizen of the United States, residing at Los Angeles, in the county of Los Angeles and State of California, have invented a new and useful Controller for Automobiles, of which the following is a specification.

The primary object of this invention is to provide a controller for automobiles which can be easily held in different positions of adjustment to regulate the speed or power of the automobile as desired.

My invention is particularly adapted for use in connection with automobiles driven by gas-engines or internal-combustion engines, although by suitable modifications it is applicable to other forms of automobiles.

It is usual to control automobiles of the character above mentioned by means of a device operated by the foot of the chaffeur, such device being located in or extending through the bed or floor of the vehicle and connected to the gas-engine in such manner as to control the feed or power thereof. Owing to the vibration or jolting of the vehicle-body, particularly in a vertical direction, it is difficult for the operator to maintain the controlling device in any position except wholly on or wholly off—that is to say, for either maximum speed or minimum speed.

My invention provides a controlling device which may be moved and held in any position to give any desired speed or power within the range of the apparatus and with little effort on the part of the operator.

This invention comprises a pedal-support, a pedal mounted to turn pivotally on a vertical axis in a horizontal direction and to yield resiliently downward, and means for holding the pedal against pivotal movement when depressed. Such means, as hereinafter described, preferably includes detent means on the pedal and fixed detent means for engagement therewith when the pedal is depressed.

The accompanying drawings illustrate the invention.

Figure I is a plan of the controlling device in normal or inoperative position. Fig. II is a plan showing the same in operative position. Fig. III is a longitudinal section of a portion of an automobile, showing my invention applied thereto.

1 designates a portion of the floor of an automobile. A short vertical rock-shaft 2 is journaled in a suitable bearing 3 in said floor and is connected at its lower end by suitable means to the controlling valve or means of the motor of an automobile. At its upper end this shaft 2 carries a plate 4, constituting a pedal, said plate being adapted to receive and support a foot of the operator and having lugs or flanges 5 adapted to engages with the operator's shoe in such manner as to enable the operator by turning his foot to cause the pedal-plate to turn on the pivotal shaft 2. A fixed stop 6 is provided at one side of this pedal-plate, said stop 6 and bearing 3 being desirably formed on a single base-plate 7, attached to the floor of the vehicle. A segment-flange 8 on said base-plate 7, extending under the pedal-plate 4, is provided with a series of notches or detent means 9, adapted to receive and engage a dependent lug or detent means 10 on the pedal-plate 4 when said plate is depressed, and thereby hold the pedal-plate in any desired position of angular adjustment. Said pedal-plate is normally held or maintained in position above said rack-plate 8, so that in the rocking movement of the pedal in a horizontal plane its lugs 10 will travel over the rack-plate without touching the same and will yield resiliently in a downward direction under pressure of the operator's foot to cause engagement of the lug and rack-plate. For this purpose the plate 4 is desirably made of elastic metal sufficiently thin to enable the operator to depress the plate with little effort.

Means are provided for drawing the pedal-plate normally against the stop 6. Such means are shown as associated with the controlling-valve of a gas-engine.

Referring to Fig. III, 11 designates the engine; 12, its controlling-valve, which may be an ordinary gate-valve controlling the supply of mixture to the engine; 13, a spring to hold the valve in position to admit a minimum of mixture, and 14 a connection from the valve to an arm 15, secured on the vertical rock-shaft 2. The spring 13 besides holding the valve toward closed position also holds the pedal 4 against the fixed stop 6. When the controller is in normal postion, (shown in Fig. I,) the valve 12 will admit just sufficient mixture to the engine to cause it to turn over without load. In using the controller to regulate the speed of the vehicle the operator will place his foot on the pedal 4 and turn same toward the position shown in Fig. II, thereby opening the controlling-valve 12, and when the pedal has been brought to the angular position of adjustment corresponding to the desired speed or power he will depress the pedal 2 to bring its lug 10 into engagement with the detent-rack means 8 9, thereby maintaining the valve in this position of adjustment and keeping the vehicle at the given power or speed as long as may be desired and with little or no effort on his part, it being simply necessary to allow the foot to rest on the pedal-plate.

What I claim, and desire to secure by Letters Patent of the United States, is—

1. A controller for automobiles comprising a pedal-support, a pedal mounted to turn pivotally in a horizontal direction and to yield resiliently downward, and means for holding the pedal against pivotal movement when depressed.

2. A controller for automobiles comprising a pedal-support, a pedal pivoted to move on a vertical axis in a horizontal plane and adapted to yield resiliently in a downward direction, detent means on said pedal and fixed detent means engaging the detent means on the pedal to hold same in different angular positions upon depression of the pedal-plate.

3. A controller for automobiles comprising a pedal-support, a vertically-resilient pedal pivoted to rock on a vertical axis in a horizontal plane, a stop for said pedal, means for drawing the pedal toward a position in which it will be arrested by said stop, and detent means respectively connected to the pedal and to the fixed support and attached to engage on depression of the pedal to maintain the pedal in different angular positions, the pedal tending to swing upward to release the engagement of the detent means.

4. The combination of a vertical rock-shaft, an elastic pedal-plate carried thereby and having shoe-engaging lugs and a dependent lug, stop means adapted to arrest the rocking movement of the plate in one direction, means for drawing the plate in a direction to cause it to be arrested by said stop means, and a detent means beneath the path of the depending lug on said plate, having a series of notches adapted to be engaged by said dependent lug upon depression of the plate, the pedal tending to swing upward to release the engagement of the detent means.

5. The combination of a vertical rock-shaft, an elastic pedal-plate carried thereby and having shoe-engaging means and a dependent lug, engine-controlling means connected to the pedal-plate, a stop engaging said pedal-plate, spring means connected to the engine-controlling means and to the pedal-plate to hold the engine-controlling means toward closed position and the pedal-plate against its stop, and rack-detent means engaging the dependent lug upon depression of the pedal-plate to hold the valve and plate in any position of adjustment, the pedal tending to swing upward to release the engagement of the detent means.

In testimony whereof I have signed my name to this specification, in the presence of two subscribing witnesses, at Los Angeles, in the county of Los Angeles and State of California, United States of America, this 1st day of October, 1903.

ALFRED C. STEWART.

Witnesses:
FREDERICK D. LYON,
G. T. HACKLEY.